April 21, 1964 G. K. KOHN 3,130,039
HIGH ANALYSIS COMPLEX FERTILIZER PREPARATION
Filed April 11, 1962
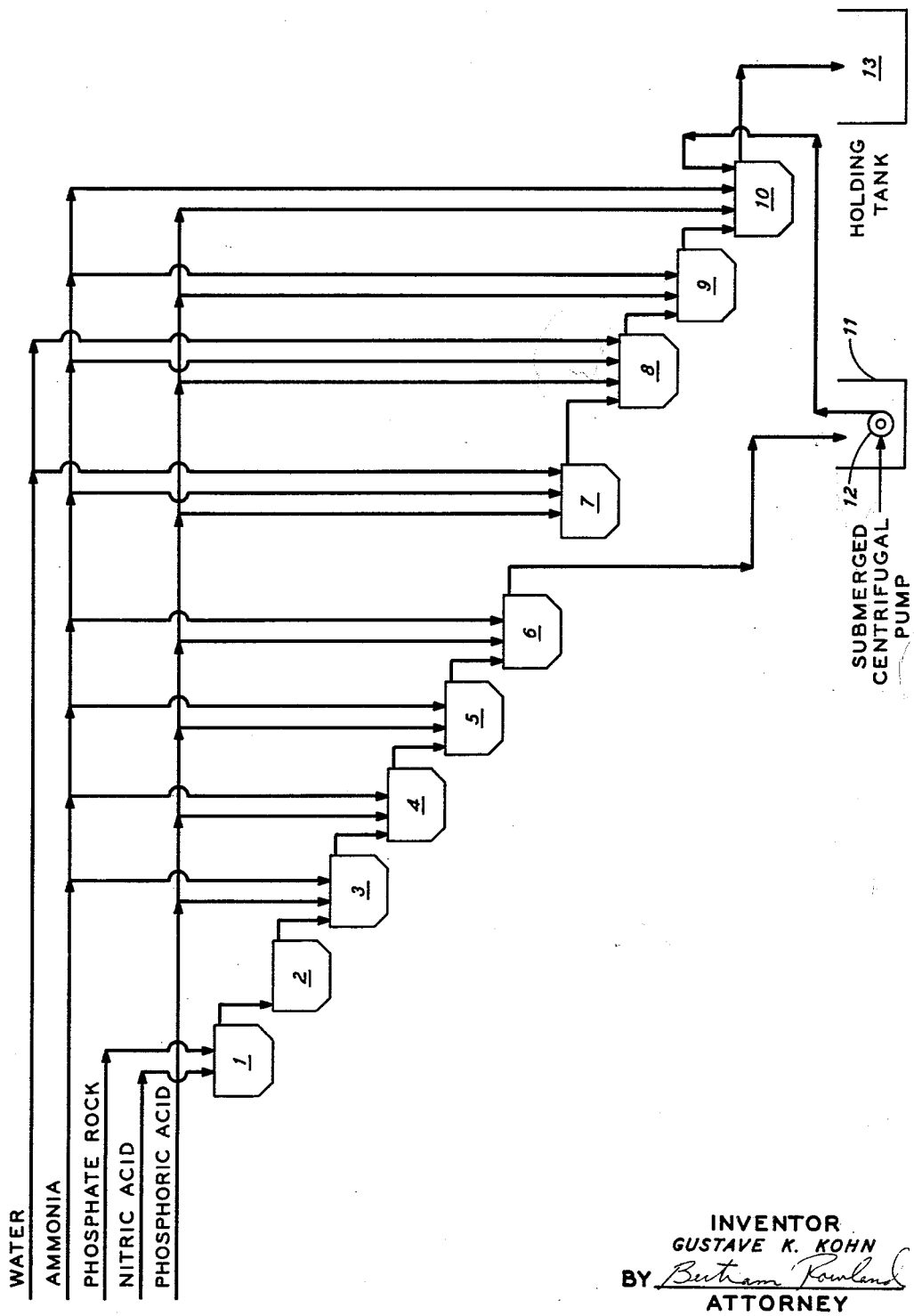
INVENTOR
GUSTAVE K. KOHN
BY Bertram Rowland
ATTORNEY 3,130,039
Patented Apr. 21, 1964

3,130,039
HIGH ANALYSIS COMPLEX FERTILIZER
PREPARATION
Gustave K. Kohn, Berkeley, Calif., assignor to California Research Corporation, San Francisco, Calif., a corporation of Delaware
Filed Apr. 11, 1962, Ser. No. 186,762
5 Claims. (Cl. 71—37)

This invention relates to an improvement in the method for producing high analysis complex fertilizers. More particularly, this invention relates to a novel method of providing flowable mixtures when using a process employing slurries in preparing high analysis complex fertilizers.

An important advance in the preparation of complex fertilizers was provided in U.S. Patent No. 2,726,949. This invention provides a novel method of preparing fertilizers where all of the calcium phosphate present was in the form of the desired dicalcium phosphate. The method employed the addition of nitric and sulfuric acids and ammonia in a series of additions in a single train of reactors, while maintaining the composition as a flowable slurry. Basically, the rock phosphate is acidulated with nitric acid and then ammonia and sulfuric acid are added in increments while gradually increasing the pH to a pH approximately in the range of 5.5 to 6.5.

The conditions under which the additions are carried out insure intimate mixing. Moreover, the use of slurries permits careful control insuring the proper composition in the final mixture. The reactors are set up so that the mixture flows from reactor to reactor. The material being added causes the reactor to overflow into the next adjacent reactor, the overflow continuing down the line. During the additions, the temperature of the process is maintained in the range of about 85° to 110° C.

The use of a slurry has numerous advantages. As compared to relatively dry processes, slurries permit rapid and complete reaction. By having the reactions go to completion, the need for curing of the product is avoided. In non-slurry treatment when curing is not complete, exothermic reactions occur during storage with potentially dangerous generation of heat and subsequent lumping of the product. When ammonium nitrate is present in considerable amounts, excessive heat caused by these reactions may result in dangerous and destructive fires and explosions. Besides avoiding incomplete reactions, another advantage is that in some drying or granulating procedures it is necessary to have a flowable slurry for proper operation.

The process exemplified in U.S. Patent No. 2,726,949 has the limitation that the slurries must always be flowable. A fluidity approaching water is preferred. When preparing high total analysis products, the mixtures become sirupy, set up as solid or gel, and cease flowing. Cessation of flow in a given vessel causes the preceding vessels to fill up and overflow. This requires stopping the additions of the various materials until the slurry can be made to flow again, cleaning up of the area and wastage in manpower, time and materials.

Gelation and thickening is caused by a combination of factors. Increasing the units of phosphate in the slurries, when using phosphate rock or wet process phosphoric as the source of phosphate, also increases the amount of iron and aluminum in the slurry. The metal phosphates, hydroxides and complexes are notoriously colloidal in nature, producing thixotropic gels which makes the handling of the slurries difficult. Increasing the amount of metals present increases the probability of the slurry setting up.

Added to the problems of gelation is the problem of the solubilities of the various ingredients in the mixture. The solubility of ammonium phosphates in the form of either monoammonium phosphate ($NH_4H_2PO_4$) or diammonium phosphate (($NH_4$)$_2HPO_4$) is lower than the solubility of a mixture of the two compounds, that is, a solubility maximum is obtained with a mixture intermediate between the two compounds. See Brosheer, J. C., and Anderson, J. F., J. Am. Chem. Soc. 68, 904 (1946). The pH of the final product, approximately 6, is approximately at the solubility maximum, the mixture intermediate the mono- and diammonium phosphate.

The method employed in U.S. Patent No. 2,726,949 starts with the acidulation of phosphate rock with nitric acid. The subsequent neutralization of the phosphoric acid thus formed must pass through the pH where the ammonium phosphate is almost exclusively in the form of the poorly soluble monoammonium phosphate. The presence of ammonium nitrate further decreases the solubility of the monoammonium phosphate, by virtue of the common ion effect. Precipitation of the salts when combined with gelation caused by the iron and aluminum can completely inhibit the slurry's flow.

The maintenance of flowable slurries is further deterred by the presence of the slightly soluble dicalcium phosphate ($CaHPO_4$). Increasing the units of dicalcium phosphate in the slurry increases the problems of viscosity, gelation and flowability. While calcium nitrate is much more soluble than dicalcium phosphate, it is necessary that all the calcium nitrate be converted to the dicalcium phosphate. The hygroscopic nature of the calcium nitrate results in lumping of the dry fertilizer product which is undesirable and makes the fertilizer commercially unfit.

Increasing the amount of water is an inadequate answer to the problems of solubility and flowability. The economics of preparing fertilizers by the use of slurries requires that the drying costs and difficulties be minimized. Increasing the percent of water not only greatly increases cost of subsequent evaporation of water but seriously reduces efficiency by slowing down the rate of production.

It has now been found that fertilizers having a nutrient analysis higher than complex fertilizers previously made with slurries can be obtained using slurries in a continuous process, even in the presence of significant amounts of iron and aluminum and with the formation of significant amounts of ammonium nitrate and dicalcium phosphate. Moreover, the calcium phosphate in the final product is all in the desired dicalcium phosphate form. The high analysis fertilizers rich in nitrogen and phosphorus are achieved by dividing the reaction train into at least two parallel trains and forming flowable slurries in each train. When the two trains are combined in the desired proportion, they provide a slurry of the desired high analysis complex fertilizer in a flowable form.

The two types of mixtures which fulfill the requirements of flowability and provide the necessary ingredients are known in the art as Ammo-Phos (or ammonium phosphate) and nitrophosphate (or nitric phosphate). Ammo-Phos and nitrophosphate fertilizers are described in: Chemistry and Technology of Fertilizers by V. Sauchelli, Am. Chem. Soc., Monograph Series, Reinhold Publishing Corp. (1960), pages 299 and 322 respectively; Commercial Fertilizers by G. H. Collings, McGraw-Hill Book Co. (1955), pages 107 and 198 respectively; Phosphate Processes at Trail, B.C., by J. Atwell, Industrial & Engineering Chemistry, 41, 1318 (1949); and TVA Process for Production of Granular Diammonium Phosphate by R. D. Young, G. C. Hicks and C. H. Davis, presented at the Am. Chem. Soc. 140th meeting, Chicago, Illinois, September 3–8, 1961.

The Ammo-Phos fertilizer is made in this invention by neutralizing wet process phosphoric acid with ammonia to a pH of approximately 6. While not essential, the ammonia and phosphoric acid may be combined in the proper proportions, wherein the pH is maintained at or near that which provides the maximum solubility for the ammonium phosphate salts. Thus ammonia and wet process phosphoric acid are simultaneously and incrementally added with agitation. The proportions are adjusted to obtain a pH of 5 or above, preferably in the range 5.5 to 6.5, particularly preferred at about 6. When the reactor is full the materials overflow into the next reactor, in which further additions of ammonia and wet process phosphoric may be made. Water may be added as needed. The use of a number of reactors permits rapid reaction and efficient mixing.

The wet process acid may be obtained commercially or may be prepared by treating phosphate-containing rock with sulfuric acid and then separating the liquid phosphoric acid from the solid calcium sulfate. The amount of phosphorus in the wet process acid is measured as percent $P_2O_5$ and will usually vary in the range 30 to 60%. Varying amounts of calcium, iron, aluminum and other metals and minor constituents are retained in the wet process acid. The amounts of iron and aluminum are usually greater than 1.5% by weight of the wet process phosphoric acid, calculated as their oxides, i.e., $R_2O_3$. Usually the range is 2–3%, although it may be as high as 4%.

The nitrophosphate fertilizer is prepared by acidulating phosphate-containing rock with nitric acid according to the following simplified equations:

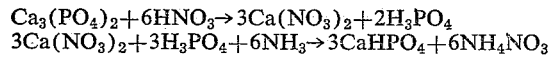
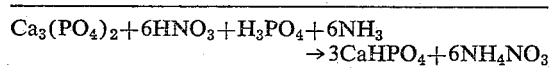

All of the phosphate in the rock is initially converted to a water soluble phosphoric acid form as phosphoric acid or monocalcium phosphate. The nitrophosphate slurry in this invention is prepared by attacking phosphate rock with nitric acid. The mixture overflows into the next reactor. Ammonia and phosphoric acid are added in such proportions that the pH gradually rises to greater than 5 preferably in the range of 5.5 to 6.5, and all of the calcium is ultimately in the form of dicalcium phosphate. Preferably, ammonia and phosphoric acid are added in a small excess above that required to form the dicalcium phosphate to provide an ammonium phosphate buffer for the system.

The Ammo-Phos and nitrophosphate slurries are combined in desired proportions. Any adjustment in pH may be made by the addition of ammonia or phosphoric acid in the final reactor.

Although sulfuric acid may be used in this process, it is not preferred, since it reduces the amount of available plant nutrients, i.e., $N:P_2O_5:K_2O$. Calcium and ammonium are combined, in part, as the sulfate, which when phosphoric acid is used, would be combined with phosphate. However, in some regions fertilizers containing sulfur are desired, and in those fertilizers sulfuric acid could be used in place of phosphoric acid. The use of sulfuric acid in place of phosphoric acid does not avoid the problems already discussed.

For the reasons previously stated, it is desirable to obtain a moisture content of the nitrophosphate and Ammo-Phos slurries, and the mixtures thereof, below 25%, and particularly below 20%. While amounts greater than 25% moisture content are operable, these are less efficient because of the increased difficulty and cost of drying.

If a ternary fertilizer is desired, it is preferable to add the potassium salt to the final slurry. Other salts may also be added at this time. A complete fertilizer is thus obtained, which contains the three plant food elements ($N, P_2O_5, K_2O$) mainly in complex chemical combinations.

The temperatures of the slurries are maintained in the region of 85–110° C., preferably 90–105° C. High temperatures should be avoided to prevent excessive evaporation and ammonia losses, while lower temperatures reduce the solubility of the salts and cause the slurry to thicken and set up.

High analysis $N:P_2O_5:K$ fertilizers are defined here as those having at least 40 units of plant food. The units are measured as percent nitrogen:percent $P_2O_5$:percent $K_2O$. The ratios of the various materials to each other may be varied in this invention by varying the amounts of materials used. Common ratios of $N:P_2O_5:K_2O$ are 1:1:0, 2:1:0, 1:1:1, 1:2:2, 1:4:4, etc. High analysis fertilizers finding common use are 16:16:16, 22:22:0, 25:25:0, 10:20:20, etc.

The process may be carried out as a batch or continuous process. The process of this invention is particularly advantageous with a continuous process, but also has advantages with a batch method. A flowable slurry permits easier and more efficient stirring, providing homogeneity and rapid reaction between the various constituents. While this invention is directed toward the preparation of high analysis fertilizers, increased efficiency may be obtained with comparatively low analysis fertilizers, i.e., less than 40 nutrient units.

In a typical continuous run for preparing 100 tons/day of 22:22:0, 6,108 lbs./hr. of 57% nitric acid and 1,220 lbs./hr. of phosphate rock (31.5% $P_2O_5$) was introduced into reactor 1 which overflowed into reactor 2. The slurry from reactor 2 overflowed into reactor 3 to which 198 lbs./hr. of wet process phosphoric acid (52% $P_2O_5$) (phosphoric acid unless otherwise indicated is wet process phosphoric acid 52% $P_2O_5$) and 376 lbs./hr. of ammonia were added. To the overflow in reactor 4 was added 198 lbs./hr. of phosphoric acid and 269 lbs./hr. of ammonia. This mixture overflowed into reactor 5 to which was introduced 198 lbs./hr. of phosphoric acid. To the slurry overflow into reactor 6 was added 121 lbs./hr. of ammonia. The flowable slurry then overflowed into a holding tank 11 from which it was pumped by pump 12 to reactor 10. The pH in reactor 5 was 3 while in reactor 6 was 5.9.

Into reactor 7 was introduced 745 lbs./hr. of phosphoric acid, 143 lbs./hr. of ammonia and 1 gal./min. of water. The slurry overflowed into reactor 8, to which was added equal amounts of material as initially introduced into reactor 7. To the overflow into 9 was added the same amounts of material as had been added to the previous reactors. The pH was maintained at 5.6.

The easily flowable overflow from 9 was mixed with the slurry from reactor 6 in reactor 10 to provide a flowable slurry. A small addition of ammonia was necessary to bring the mixture to the desired final pH 6.0. The final slurry was then diverted to a holding tank 13. The slurry may then be dried to obtain the desired dry slurry.

By controlling the additions to the various vessels, the proportion of nitrophosphate and Ammo-Phos slurries may be controlled in order to obtain the desired ratio of material in the complex fertilizer end product. Potassium as the chloride or sulfate salt may then be added in the desired amount to obtain a ternary fertilizer. Trace materials may also be added.

The fertilizer mixture may be diverted to the mixer at any of the vessels. The splitting of the stream is easily achieved allowing great flexibility in varying the composition of the two mixtures which are ultimately diverted to the mixer. Any number of vessels may be used beyond three.

In a typical preparation of 16:16:16 complex fertilizer by a continuous method using a split stream, 12,835 lbs./hr. of 57% $HNO_3$ and 2,714 lbs./hr. of phosphate rock were mixed in the first and second reactor. In the third to sixth reactors, 1,311 lbs./hr. of phosphoric acid were mixed with 2,000 lbs./hr. of ammonia, the pH increasing from 0.5 in the third reactor to 5.9–6.2 in the sixth reactor. An additional 4,754 lbs./hr. of phosphoric acid, 886 lbs./hr. of ammonia and 1,690 lbs./hr. of water were mixed in the seventh to ninth reactors, the pH varying between 5.5–6.2. The slurry from reactor 6 was then combined with the slurry from reactor 9 in reactor 10, and 6,558 lbs./hr. of KCl added to give a 16:16:16 product with a pH of about 5.9–6.2. At all times the slurries were flowable and the final mixture was flowable.

By comparison, an attempt to prepare 16:16:16 in a single train failed. Phosphate rock (2,714 lbs./hr.) was mixed with 12,835 lbs./hr. of 57% $HNO_3$ and mixed in the first two reactors. To this mixture was then added 6,065 lbs./hr. phosphoric acid, 2,886 lbs./hr. ammonia and 3,750 lbs./hr. water in the next six reactors, and 6,558 lbs./hr. of KCl added in the final reactor. The pH had risen from 0.6 to 3.5 by the seventh reactor and the slurry would no longer flow, requiring constant manual assistance to keep the fertilizer mixture moving. The final product had a pH of 5.9–6.2 but would barely flow.

The following is a comparison of two preparations of 22:22:0 fertilizer. By mixing 11,722 lbs./hr. of 57% $HNO_3$, 2,416 lbs./hr. of phosphate rock, 1,168 lbs./hr. phosphoric acid, and 1,826 lbs./hr. of ammonia in one train, and 4,435 lbs./hr. phosphoric acid, 827 lbs./hr. ammonia and 1,580 lbs./hr. water in a second train, the slurries were flowable throughout the preparation and gave a flowable end product. Contrasted to this, when mixing 11,722 lbs./hr. 57% $HNO_3$ with 2,416 lbs./hr. phosphate rock and then adding 5,603 lbs./hr. phosphoric acid, 2,653 lbs./hr. ammonia and 3,500 lbs./hr. water, the slurry would no longer flow in the last few reactors and the product barely flowed.

As an example of carrying out a batch treatment on a small scale, 10.6 pounds of western phosphate rock was treated with 50.0 pounds of 57% nitric acid with agitation in a water jacketed vessel. It is preferred to add the rock incrementally. A stirrable slurry was obtained, to which was added 4.65 pounds of phosphoric acid and 6.47 pounds of ammonia. A flowable nitrophosphate slurry was obtained (58.3 pounds) having a moisture content of 15.4% and an analysis on a dry basis of 23.3:13.8:0. (The numbers stand for: N percent–$P_2O_5$ percent–$K_2O$ percent.)

In another reaction vessel equipped for cooling, 18.1 pounds of phosphoric acid, 3.5 pounds of ammonia and 3.7 pounds of water were mixed by increments yielding 22.3 pounds of an Ammo-Phos fertilizer having a moisture content of 18.6%. The Ammo-Phos analyzed on a dry basis as 13.5:54.5:0.

The total amounts of nitrophosphate and Ammo-Phos, which were both flowable were mixed, by increments, while 1.8 pounds of additional water was added. At all times the mixture was stirrable and the resulting product was sufficiently fluid to be flowable. The product weighed 82.4 pounds, had a moisture content of 15.8% and had a dry analysis of approximately 20.7:24.1:0.

To the resulting mixture 25.5 pounds of potassium chloride were added yielding 107.9 pounds of a fertilizer slurry having about 12% moisture content and having a dry analysis of approximately 18:21:16.

Following the above method, a nitrophosphate was prepared using 30.0 pounds nitric acid (57%), 6.4 pounds phosphate rock, 2.8 pounds phosphoric acid and 4.6 pounds ammonia. The resulting nitrophosphate was flowable, had a moisture content of 21.8% and a dry analysis of 24.9:12.2:0.

The Ammo-Phos was prepared from 61.6 pounds of phosphoric acid, 10.0 pounds of water and 10.1 pounds ammonia, yielding a product having 15.0% moisture and a dry analysis of 15.2:58.8:0.

2.6 parts by weight of nitrophosphate and one part by weight of Ammo-Phos produced above were mixed together to give a flowable slurry having a moisture content of 20.2% and a dry analysis of 22.6:24.8:0.

As will be evident to those skilled in the art, various modifications on this process can be made or followed, in the light of the foregoing disclosure and discussion, without departing from the spirit or scope of the disclosure or from the scope of the following claims.

I claim:
1. A process for preparing high analysis complex fertilizers having total nutrients of at least 40, wherein said nutrients are measured as percent nitrogen, percent $P_2O_5$, and percent $K_2O$, containing nitrogen and phosphorus as major constituents which comprises:
 (1) in a first train of reactors,
  (a) acidulating phosphate rock with nitric acid to form a slurry in which all of the phosphate is converted to a water soluble phosphoric acid form,
  (b) adding incrementally at least one member of the group consisting of sulfuric and phosphoric acids which member in combination with the phosphate initially present in the rock is in an amount sufficient to combine with substantially all the calcium present in the form of at least one member of the group consisting of dicalcium phosphate and calcium sulfate,
  (c) while incrementally and simultaneously ammoniating the mixture until a pH of from 5 to neutrality is reached,
  (d) providing a flowable nitrophosphate slurry;
 (2) in a second train of reactors,
  (a) ammoniating wet process phosphoric acid to produce a slurry having a pH of from 5 to neutrality,
  (b) maintaining the water content in an amount sufficient to provide flowability but not in excess of 25% by weight of the slurry;
 (3) combining the slurry from the first train of reactors with the slurry from the second train of reactors in sufficient proportions;
 (4) to obtain a flowable slurry of the complex fertilizer having at least 40 total nutrient units.

2. A process for preparing complex fertilizers in a slurry having total nutrient units of at least 40 wherein said units are measured as percent nitrogen, percent $P_2O_5$, and percent $K_2O$, which comprises:
 (1) in a first train of reactors,
  (a) acidulating phosphate rock with nitric acid to form a slurry in which all the phosphate is converted to a water soluble phosphoric acid form,
  (b) incrementally adding ammonia and phosphoric acid in sufficient proportions to convert all the calcium present into dicalcium phosphate;
 (2) in a second train of reactors,
  (a) ammoniating wet phosphoric acid to a pH of from 5 to neutrality,
  (b) while adding water to maintain flowability of the slurry in an amount wherein the water content of said slurry is less than 25% by weight;
 (3) combining the slurry from the first train of reactors with the slurry from the second train of reactors in sufficient proportions to obtain a complex fertilizer having at least 40 total nutrient units as a flowable slurry.

3. A process according to claim 1 wherein a desired amount of potassium is added when combining the slurries from the first and second train of reactors.

4. A process according to claim 2 wherein a desired amount of potassium is added when combining the slurries from the first and second train of reactors.

5. A process according to claim 2 wherein in the second train of reactors in the ammoniating of the wet process phosphoric acid, a pH is maintained of about 5.

References Cited in the file of this patent
UNITED STATES PATENTS

| | | |
|---|---|---|
| 1,999,026 | Tramm et al. | Apr. 23, 1935 |
| 2,726,949 | Andres et al. | Dec. 13, 1955 |

(Other references on following page)

UNITED STATES PATENTS

| | | |
|---|---|---|
| 2,845,340 | Karbe et al. | July 29, 1958 |
| 2,891,856 | Getsinger et al. | June 23, 1959 |
| 2,957,763 | Barnes et al. | Oct. 25, 1960 |
| 3,005,697 | McKnight et al. | Oct. 24, 1961 |
| 3,019,099 | Walters | Jan. 30, 1962 |
| 3,049,416 | Brown et al. | Aug. 14, 1962 |

FOREIGN PATENTS

| | | |
|---|---|---|
| 430,380 | Great Britain | June 18, 1935 |

OTHER REFERENCES

Waggaman: "Phosphoric Acid, Phosphates and Phosphate Fertilizers," 2nd ed., pp. 420–436 (particularly pp. 422–423, 427–432), 1952, Reinhold Pub., N.Y., N.Y.

Sauchelli: "Chemistry and Technology of Fertilizers," pp. 287, 299, 306, 308, 322, Reinhold, N.Y., N.Y.

Collings: "Commercial Fertilizers," pp. 107, 111, 198, McGraw-Hill, 1955, New York, N.Y.

Canadian Patent Office Record (Dec. 12, 1929), condensation of #2,871,192.